(12) United States Patent
Keeley et al.

(10) Patent No.: US 10,418,017 B1
(45) Date of Patent: Sep. 17, 2019

(54) ACOUSTIC INSULATION WITH HOOK AND LOOP FASTENERS

(71) Applicants: Tyler Keeley, Charlotte, NC (US); Will Gardner, Charlotte, NC (US); Matt Plickert, Huntersville, NC (US)

(72) Inventors: Tyler Keeley, Charlotte, NC (US); Will Gardner, Charlotte, NC (US); Matt Plickert, Huntersville, NC (US)

(73) Assignee: Technicon Industries, Inc., Concord, NC (US)

( * ) Notice: Subject to any disclaimer, the term of this patent is extended or adjusted under 35 U.S.C. 154(b) by 139 days.

(21) Appl. No.: 15/444,424

(22) Filed: Feb. 28, 2017

(51) Int. Cl.
*G10K 11/168* (2006.01)
*E04B 1/86* (2006.01)
*F16B 1/00* (2006.01)

(52) U.S. Cl.
CPC .............. *G10K 11/168* (2013.01); *E04B 1/86* (2013.01); *F16B 1/00* (2013.01); *F16B 2001/0028* (2013.01)

(58) Field of Classification Search
CPC ...... E04B 1/86; F16B 1/00; F16B 2001/0028; G10K 11/168
USPC ........................................................ 181/287
See application file for complete search history.

(56) References Cited

U.S. PATENT DOCUMENTS

| | | | | |
|---|---|---|---|---|
| 7,992,678 B2 * | 8/2011 | Pilaar | ...................... | B32B 27/40 181/207 |
| 2006/0185931 A1 * | 8/2006 | Kawar | ....................... | G06F 1/18 181/202 |
| 2007/0056796 A1 * | 3/2007 | Marlowe | ................... | H04R 5/02 181/199 |
| 2010/0065366 A1 * | 3/2010 | Soltau | ................... | B60R 13/083 181/286 |
| 2014/0299403 A1 * | 10/2014 | Lee | ......... | G10K 11/16 181/204 |
| 2014/0299407 A1 * | 10/2014 | Caimi | ..................... | E04B 9/001 181/287 |
| 2015/0279345 A1 * | 10/2015 | Mathur | ................ | G10K 11/162 181/294 |

* cited by examiner

*Primary Examiner* — Forrest M Phillips
(74) *Attorney, Agent, or Firm* — Tuggle Duggins P.A.; Blake P. Hurt

(57) ABSTRACT

A panel of acoustically absorbent material with at least one side carrying a portion of looped material to engage with the hooked structures of a mounting patch placed on a mounting substrate is provided. The panel may be releasably attached to the mounting substrate via the association of the looped material with the mounting patch, such that the panel of acoustically absorbent material may be removed from the mounting substrate without damaging the structural integrity of the panel. A method of releasably attaching an acoustically absorbent material to a mounting substrate is also provided.

18 Claims, 3 Drawing Sheets

ACOUSTIC INSULATION WITH HOOK AND LOOP FASTENERS

FIELD OF THE INVENTION

The invention herein pertains to acoustic foam panels and particularly pertains to a system and method of releasably fastening acoustic foam panels to a substrate without compromising the structural integrity of the foam during the mounting or repositioning processes.

DESCRIPTION OF THE PRIOR ART AND OBJECTIVES OF THE INVENTION

Positioning acoustically absorbent material such as open cell foam on, or in close proximity to noise producing members, is known in the art. In this manner, the acoustic material attenuates airborne sound waves by increasing the air resistance a given wave encounters, thus reducing the amplitude of the wave. Conventionally, a section of open cell foam is formed into a predetermined shape, often a rectangle or square, and one side of the foam is treated with a pressure-sensitive adhesive and covered with a release liner, usually a paper or polymeric-based liner substrate. When a user is ready to adhere the acoustical foam, the liner is removed and the side of the foam carrying the pressure-sensitive adhesive is positioned against the mounting substrate, for example the housing of a heater, air-conditioner, generator, or the like. Given the high modulus of adhesion defined by the pressure-sensitive adhesive and the relatively low tearing or shearing modulus of open cell foam, great care must be taken to ensure that the pressure-sensitive adhesive does not come in contact with any surface other than the desired mounting substrate, and particular care must be exercised to prevent the adhesive from contacting the foam surface which is all but impossible to separate without significant damage to the foam surface. Equally great care must be used in the application of the absorbent material as misapplication of the foam to the mounting substrate, in view of the aforementioned high modulus of adhesion defined by the adhesive, confirms that no repositioning of the foam is possible without significant damage to the foam surface. Given that the structural integrity of the foam is directly correlated with the functional ability to control and reduce noise levels, vibrations, and echoes, misapplication of the acoustical member practically also results in its disposal, leading to increased cost and material waste.

Thus, in view of the problems and disadvantages associated with prior art devices, the present invention was conceived and one of its objectives is to provide an acoustic material with a releasable mounting portion.

It is another objective of the present invention to provide a mountable acoustic material with a looped fabric portion.

It is still another objective of the present invention to provide an acoustic foam member with an unbroken loop scrim on one side and an acoustic treatment such as urethane film on the other side.

It is yet another objective of the present invention to provide a releasably positionable acoustic foam that is resistant to misapplication on a substrate and will not adhere to itself during application.

It is a further objective of the present invention to provide an acoustic foam that is efficient to manufacture and easy to install without inadvertent losses of material and resources.

It is still a further objective of the present invention to provide a method of releasably attaching an acoustically absorbent material to a substrate.

It is yet a further objective of the present invention to provide a method of releasably attaching a section of acoustic foam to a substrate, the foam including an unbroken loop scrim laminated to one side of the acoustic foam and one or more hook members affixed to the surface of a substrate, such that the hook and loop portions can cooperatively mate and release without negative impact on the structural integrity of the foam.

Various other objectives and advantages of the present invention will become apparent to those skilled in the art as a more detailed description is set forth below.

SUMMARY OF THE INVENTION

The aforesaid and other objectives are realized by providing a rectangular portion of open cell, acoustical grade, polyurethane acoustical foam with a first side treated with a urethane film for resistance to tears, rips, and the like and a second side with an unbroken loop scrim attached thereto. One or more mounting patches including a first side carrying an adhesive and a second side defining a number of hooks are positioned on a mounting substrate with the hooks facing outward (i.e. away from the mounting substrate). The acoustical foam is positioned in the desired position and the looped scrim engages with the hooks on the mounting patches to releasably hold the acoustic foam in position relative to the mounting substrate without fear that an inadvertent engagement with the foam itself will damage the structural integrity of the foam. Later, if it is determined that the foam need be repositioned, the loop scrim is cautiously separated from the hooks so as to prevent any damage to the foam, and the foam can be repositioned as desired, repositioning the mounting patches as appropriate or utilizing new mounting patches as preferred to accommodate the new orientation and position of the foam.

DETAILED DESCRIPTION OF THE PREFERRED EMBODIMENT AND OPERATION OF THE INVENTION

Figure 1:
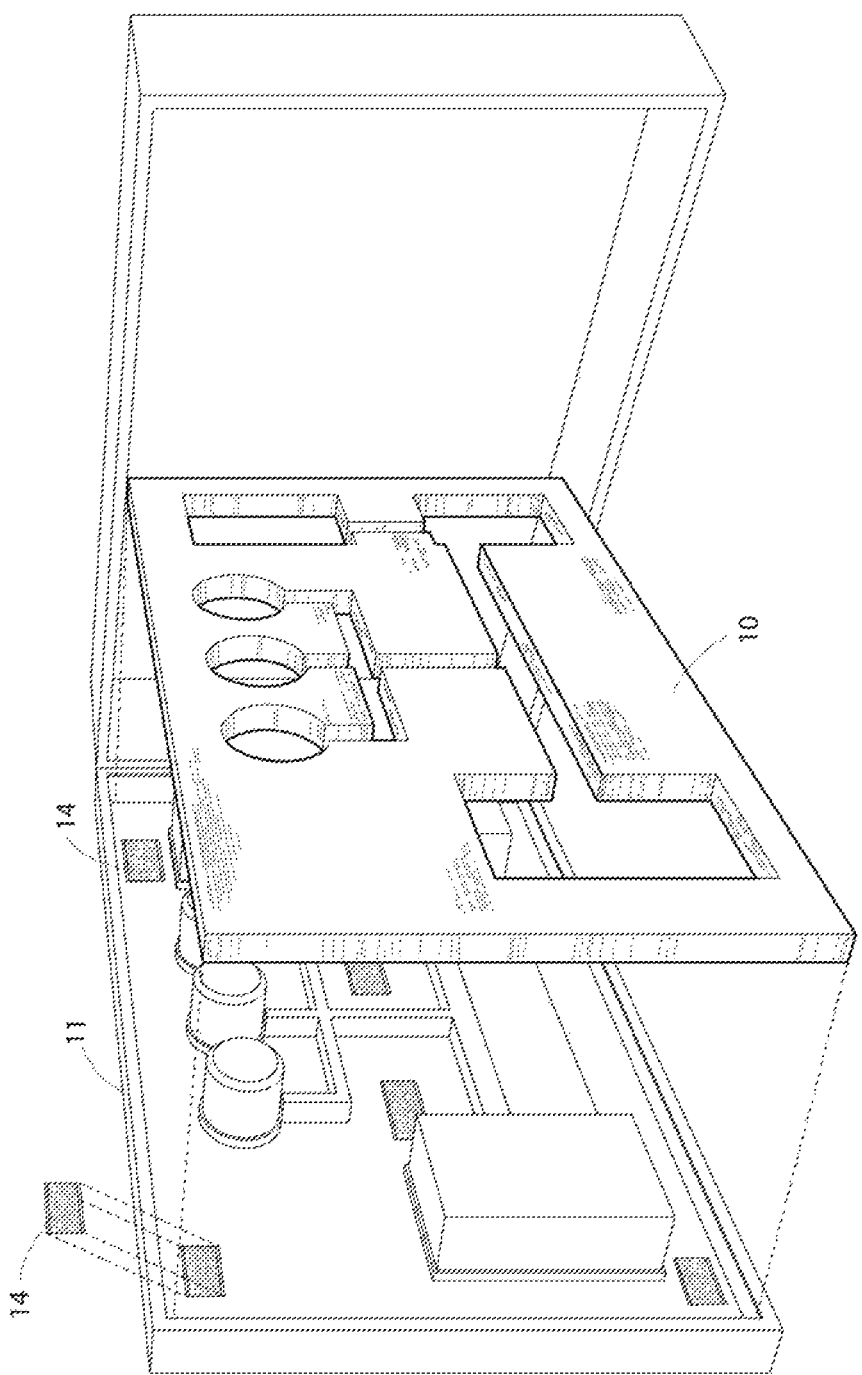
FIG. 1 shows a portion of acoustically absorbent material exploded from a mounting substrate.
Figure 2:
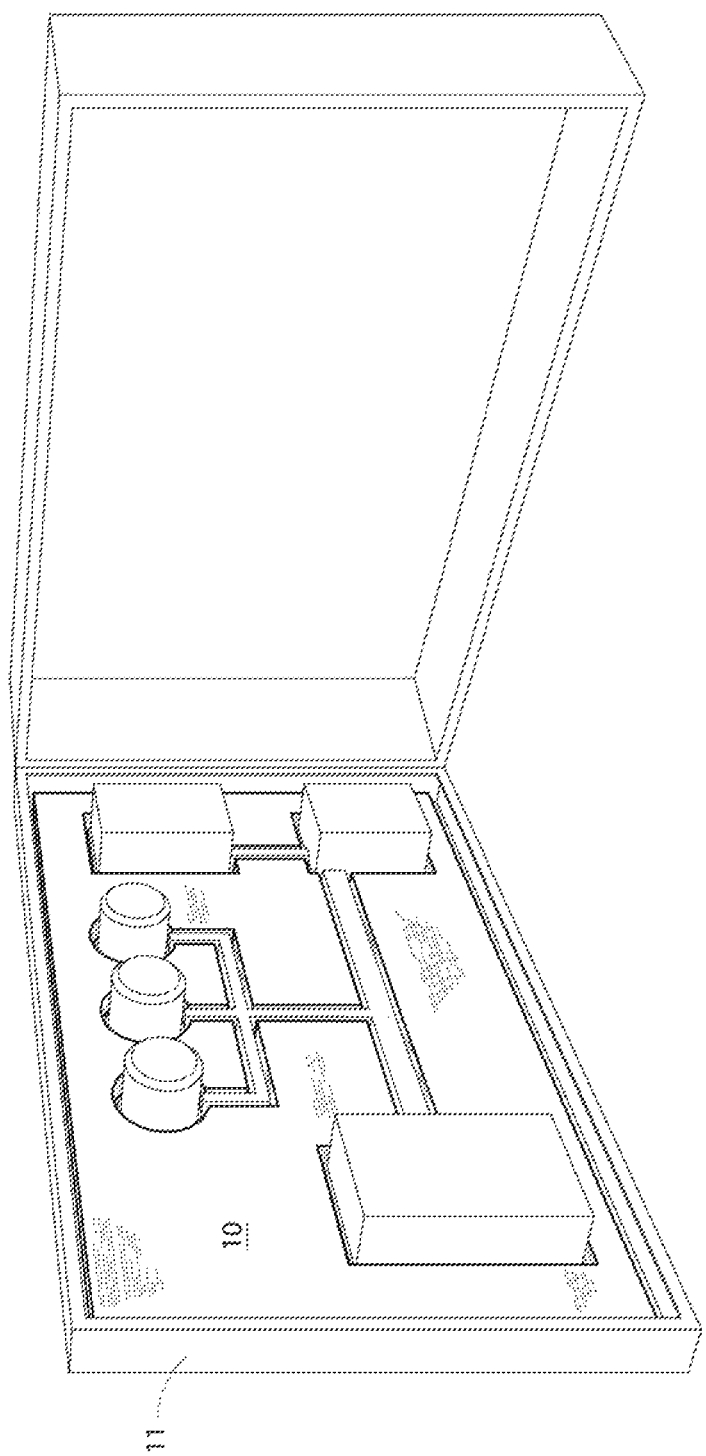
FIG. 2 pictures the acoustically absorbent material affixed to the mounting substrate.

For a better understanding of the invention and its operation, turning now to the drawings, FIGS. 1 and 2 illustrate side perspective views of absorbent material 10 separated from a mounting substrate 11 (FIG. 1) and attached to a mounting substrate 11 (FIG. 2). Mounting substrate 11 is represented schematically in FIGS. 1 and 2, and while the depiction is intended to represent an instrumentation panel of a piece of equipment, it should be understood that mounting substrate 11 is intended to be any such that it may be desirable to affix acoustically absorbent material such as absorbent material 10. By way of example, and without any intent for limitation, mounting substrate 11 may embody the housing of a heater, an air conditioner, a gasoline or diesel generator, an air compressor, and other embodiments of industrial, commercial, and residential equipment.

For the purposes of the present disclosure, the term "acoustically absorbent material" is intended to be broadly construed and may include, but is not limited to, portions formed from one or more of the following flexible (i.e. able to fold on itself without damage) materials: polyester, polyethylene, polypropylene, rubber, neoprene rubber, urethane, reticulated filter foam, polyethylene terephthalate (PET), aluminized PET, reinforced aluminum PET, vinyl, polyether, fiberglass, nitrile, vinyl nitrile, polyvinyl chloride (PVC), silicone, fluoroelastomers, ethylene propylene diene monomer, in open or closed cell embodiments, as well as woven and non-woven species. In the preferred embodiment, acoustically absorbent material 10 defines an acoustic grade, open cell, polyurethane foam defining a thickness of half an inch (1.27 cm) or greater, more preferably between half an inch and three inches (1.27-7.62 cm) or between half an inch and two inches (1.27-5.08 cm) and most preferably approximately one inch (2.54 cm) and a nominal weight density of 1.4 pounds (0.66 kg) per cubic foot, or more preferably between 1.4 pounds and 4.0 pounds (0.66-1.81 kg) per cubic foot, or most preferred between approximately 1.8 to 1.9 pounds (0.82 to 0.86 kilograms) per cubic foot (collectively referred to herein as acoustic foam). In an embodiment, acoustic foam 10 defines a substantially rectangular shape, but it should be understood that the size and shape of mounting substrate 11 are more likely to dictate the shape of acoustic foam 10 than a preconceived shape, and therefore the shape of acoustic foam 10 is not intended to be a limitation. Further, proper installation and use of acoustic foam 10 contemplates bores, apertures, channels, and the like to accommodate protrusions, projections, or any other structures that may otherwise impede secure attachment of acoustic foam 10 to mounting substrate 11. In addition to being necessary to accommodate the aforementioned protrusions, these openings (demonstrated in FIGS. 1 and 2) make acoustic foam 10 less structurally stable, increasing the likelihood that acoustic foam 10 may inadvertently come in contact with itself were a user to rely on conventional pressure-sensitive adhesive, decreasing the likelihood that proper installation of acoustic foam 10, particularly in spatially challenging regions such as corners, were to be effectuated.

Figure 3:
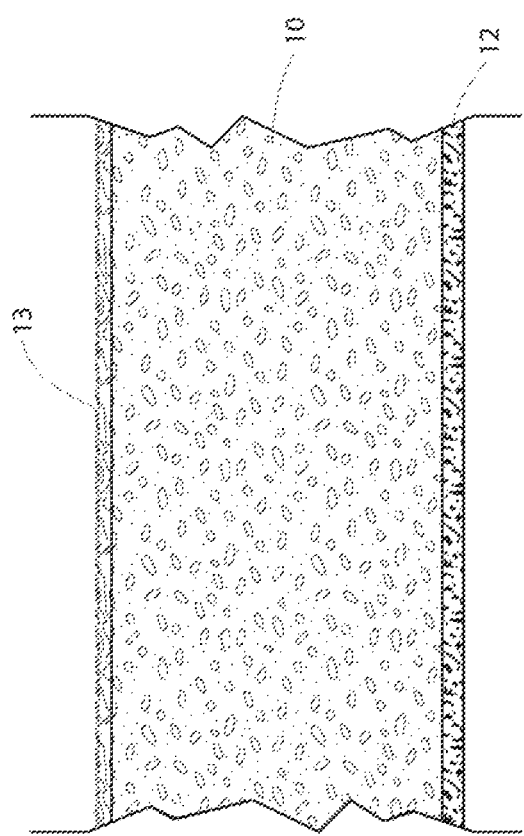
FIG. 3 depicts a side elevated cross-sectional view of the absorbent material.

FIG. 3 depicts a side elevated cross-sectional view of preferred acoustic foam 10. On a first side of acoustic foam 10, the exterior or outward facing surface (i.e. the surface more distal relative to mounting substrate 11) may be untreated or raw foam, but alternative embodiments may include a scrim layer (not shown) or an acoustic treatment layer 12, for example a urethane layer, to prevent perforations, tears, or the like in the surface of acoustic foam 10. The material used in treatment layer 12 is not intended to be a limitation, as other treatments such as embossing, vinyl, or a different species of foam may also be used. On a second side of acoustic foam 10 in opposing relation to the first side, the interior or inward facing surface (i.e. the surface more proximal relative to mounting substrate 11) includes loop material 13. Numerous embodiments of materials which define loop structures configured to engage hook material are known in the art, but a preferred embodiment of loop material 13 is referred to as an unbroken loop scrim. This material can be attached to acoustic foam 10 in a conventional manner, for example with the use of an adhesive, but preferably is laminated directly to the surface of acoustic foam 10. It should be noted that loop material 13 may be manufactured, engineered, or cut to match the specific size and shape of acoustic foam 10, including the respective openings as previously described, or loop material may be attached to acoustic foam 10 and then the materials processed together, including the formation of openings. An added benefit of acoustic foam 10 is that the product is recyclable while a piece of acoustic foam with pressure-sensitive adhesive is generally not.

FIGS. 1 and 2 further demonstrate a representative deployment of one or more mounting patches 14 that include a first side with a removable liner covering an adhesive (not shown) and a second side defining a plurality of hook structures configured to releasably engage looped structures. As these patches are available in either individual pieces or in strips on a roll, the specific nature of patches 14 will not be described in significant detail. However, the size of patches 14 relative to acoustic foam 10 and mounting substrate 11 is of note, due to the fact that unlike the prior art foam solutions, which require release liner to cover the entirety of one foam side (to protect the pressure-sensitive adhesive as been described), acoustic foam 10 and mounting patches 14 require a small fraction of the release liner to protect the much smaller surface area of the side of mounting patches 14. It is estimated that at least 90%, and specifically about 95% of release liner material would be saved with conventional 1 inch (2.54 cm) square mounting patches 14 instead of a release liner covering all of one side of a substantial piece of acoustic foam. In a related manner, the average peel adhesion measurement of the conventional pressure-sensitive adhesive is approximately one hundred fifty ounces per inch, which the peel adhesion between loop material 13 and the hook structures defined on patches 14 is approximately fifty ounces per inch. This means the delicate foam of acoustic foam 10 stands a much greater chance of being removed from mounting patches 14 than peeling acoustic foam with pressure-sensitive adhesive off of a mounting substrate, all within the requisite caution to avoid allowing the acoustic foam to stick to itself. Further, if a patch 14 wears out or needs to be repositioned, the replacement of a single patch compared to replacement of an entire portion of acoustic foam, which can cost well over $100, is a comparatively easy fix.

A method of releasably mounting a portion of acoustic foam to a mounting substrate includes the steps of providing an acoustically absorbent material such as acoustic foam 10 with a treatment layer 12 on a first side and carrying looped material 13 on an opposing side, affixing one or more mounting patches 14 with a plurality of hook structures extending therefrom on mounting substrate 11, and engaging the hook structures of the one or more mounting patches 14 with the looped material 13 of acoustic foam 10 to releasably mount acoustic foam 10 to mounting substrate 11. Additional steps may include removing acoustic foam 10 by disengaging the hook structures of mounting patches 14 from the looped material 13, repositioning or adding one or more additional mounting patches 14, and re-engaging the hook structures of the one or more mounting patches 14 with the looped material 13 of acoustic foam 10 to releasably mount acoustic foam 10 to mounting substrate 11.

The illustrations and examples provided herein are for explanatory purposes and are not intended to limit the scope of the appended claims.

We claim:

1. An acoustically absorbent material comprising a first side, the first side covered in a looped material defined as an unbroken looped scrim configured to be engaged by a hook, and a mounting patch defining a plurality of hooks configured to engage the looped material, whereby the acoustically absorbent material is releasably mounted to a substrate defined by embodiments of industrial, commercial, and residential equipment via engagement solely between the mounting patch and the looped material when the mounting patch is mounted to the substrate.

2. The acoustically absorbent material of claim 1 wherein the acoustically absorbent material is defined by polyurethane.

3. The acoustically absorbent material of claim 1 wherein the unbroken looped scrim is laminated to the first side of the acoustically absorbent material.

4. The acoustically absorbent material of claim 1 wherein the acoustically absorbent material defines a second side, the second side treated with an acoustic treatment layer.

5. The acoustically absorbent material of claim 4 wherein the acoustically absorbent material defines one or more openings that pass from the first side to the second side.

6. A method of releaseably attaching acoustically absorbent material to a mounting substrate comprising:
 Providing an acoustic material defining a first side, the first side covered in a looped material defined as an unbroken looped scrim configured to be engaged by a hook,
 affixing a mounting patch defining a plurality of hooks configured to engage the looped material only to a mounting substrate defined by embodiments of industrial, commercial, and residential equipment, and releasably engaging the mounting patch and the looped material.

7. The method of claim 6 wherein the step of providing the acoustically absorbent material includes the step of providing an acoustically absorbent material with a second side treated with an acoustic treatment.

8. The method of claim 7 wherein the acoustically absorbent material defines one or more openings that pass from the first side to the second side.

9. The method of claim 6 wherein the step of providing the acoustically absorbent material further includes laminating the unbroken looped scrim to the first side of the acoustically absorbent material.

10. The method of claim 6 wherein the acoustically absorbent material is defined by polyurethane.

11. The method of claim 6 wherein the step of affixing a mounting patch comprises affixing additional mounting patches about the mounting substrate.

12. The method of claim 11 wherein the looped material engages the additional mounting patches.

13. A combination comprising an acoustically absorbent material and a mounting substrate defined by embodiments of industrial, commercial, and residential equipment, the acoustically absorbent material defined by first and second sides, a looped material comprising an unbroken looped scrim laminated to the first side, so as to cover the first side and configured to be engaged by a hook, and an acoustic treatment layer carried on the second side; and
 A mounting patch defining a plurality of hooks configured to engage the looped material, whereby the acoustically absorbent material is directly and releasably mounted to the substrate defined by embodiments of industrial, commercial, and residential equipment via engagement solely between the mounting patch and the looped material when the mounting patch is mounted to the substrate.

14. The combination of claim 13 wherein the acoustically absorbent material is defined by polyurethane.

15. The combination of claim 14 wherein the polyurethane is defined as an acoustic grade, open cell, polyurethane foam defining a thickness between half an inch and three inches (1.27-7.62 cm).

16. The combination of claim 14 wherein the polyurethane defines a nominal weight density between 1.4 pounds and 4.0 pounds (0.66-1.81 kg) per cubic foot.

17. The combination of claim 13 wherein the acoustically absorbent material defines one or more openings that pass from the first side to the second side.

18. The combination of claim 13 wherein the unbroken looped scrim is laminated to the first side of the acoustically absorbent material.

* * * * *